Nov. 24, 1925.
A. R. CURTIS
1,562,440
WASHER DRIVE MECHANISM
Filed April 23, 1923
2 Sheets-Sheet 2
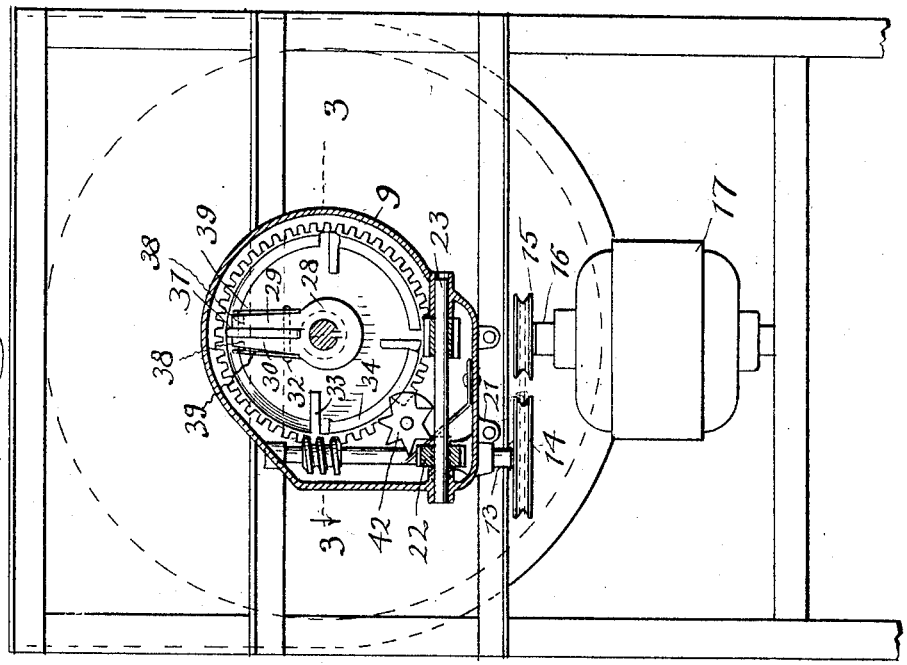
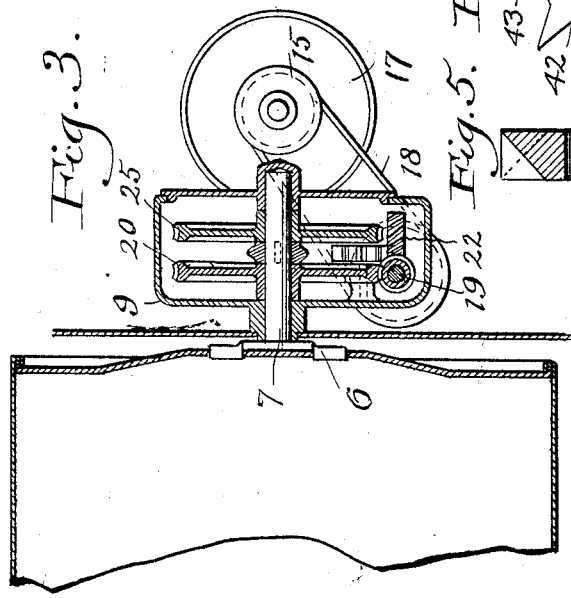
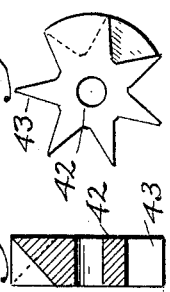
Inventor:
Arthur R. Curtis
by
Thurston Rives & Hudson
Attys.

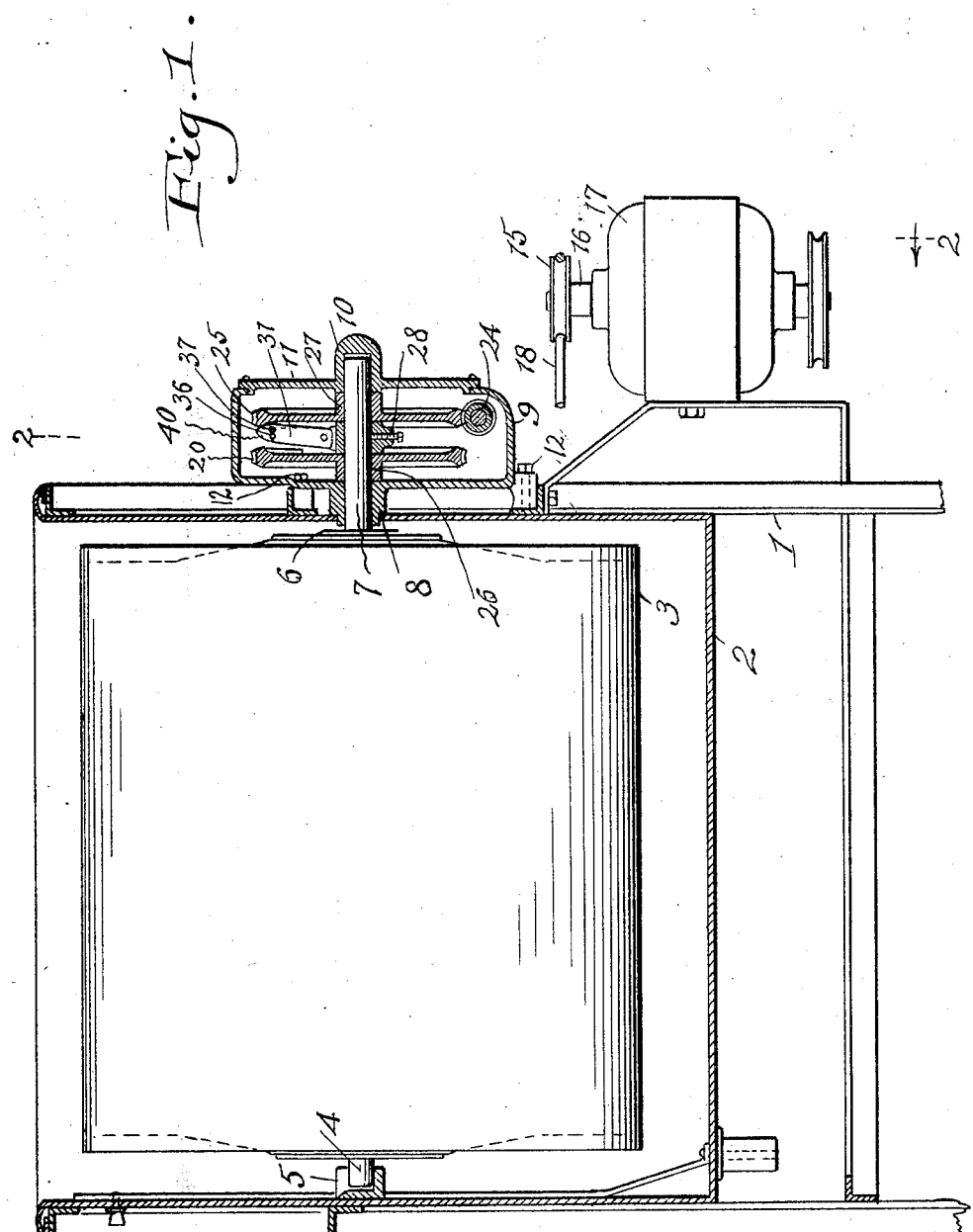

Patented Nov. 24, 1925.

1,562,440

UNITED STATES PATENT OFFICE.

ARTHUR R. CURTIS, OF CLEVELAND, OHIO.

WASHER DRIVE MECHANISM.

Application filed April 23, 1923. Serial No. 633,969.

*To all whom it may concern:*

Be it known that I, ARTHUR R. CURTIS, a citizen of the United States, residing at Cleveland, in the county of Cuyahoga and State of Ohio, have invented a certain new and useful Improvement in Washer Drive Mechanism, of which the following is a full, clear, and exact description.

This invention relates to a drive mechanism in which the driving connection is established alternately between a shaft and two driving members rotatably mounted on the shaft, and more particularly to an automatic reversing drive mechanism adapted for the purpose of rotating a driven member a predetermined number of revolutions alternately in opposite directions. Driving mechanisms of this kind may be used for a variety of different purposes, such for example as in conjunction with a washing machine for the purpose of rotating the cylinder through a number of revolutions alternately in opposite directions.

It is the object of the invention to provide a driving mechanism of the character referred to which comprises a minimum number of parts and which occupies a minimum amount of space, and in which all the parts are of simple and rugged construction.

Further, the invention aims to provide an automatically operating reversing mechanism in which there is a positive driving interlock between the shaft and driving members and in which the reverse is obtained without producing a jerky action either in the driving connections or reversing gears irrespective of whether the driven member is operating with or without load.

A further object is to provide the reversing gears with an automatic clutch shifting mechanism entirely housed within the reversing gear housing and entirely independent of the manually operated devices for connecting and disconnecting the driving connections and operating motor.

A further object is to provide combined clutch and braking elements in connection with the reversing gears whereby a braking connection is exerted upon the driven part as its direction of movement is being reversed and prior to the establishment of the positive driving interlock through which the driven part is operated in the reverse direction.

Other objects will be apparent from the following description and the accompanying drawings.

The following description and accompanying drawings set forth in detail certain means embodying the invention, the disclosed means, however, constituting but one of the various mechanical forms in which the principle of the invention may be employed.

Reference should be had to the accompanying drawings forming a part of this specification in which—

Fig. 1 is a vertical section through a washing machine showing the reversing drive mechanism applied thereto;

Fig. 2 is a vertical section on the line 2—2 of Fig. 1;

Fig. 3 is a horizontal section on the line 3—3 of Fig. 2;

Fig. 4 is a fragmentary circumferential transverse section through the portion of a gear engaged by the shiftable clutch key as it would appear straightened into a plane;

Fig. 5 and Fig. 6 show the key shifting star wheel in vertical section and in side elevation respectively.

Referring to the accompanying drawings, the washer is provided with a suitable angle iron frame work 1 which supports the washer tub 2 in which is detachably and rotatably mounted the horizontally disposed cylinder 3 which has a trunnion 4 at one end seated in an open topped trunnion socket 5 carried by an end wall of the tub and detachably supported at its opposite end upon a driving head 6 at the inner end of the cylinder operating shaft 7 which projects through the end wall of the tub. The cylinder operating shaft 7 is journaled adjacent its inner end in a bearing 8 formed upon the inner wall of a gear housing 9 and at its outer end is journaled in a bearing 10 formed in a detachable housing cover plate 11 at the outer side of the housing 9. The housing 9 contains therein the reversing gears and an automatic clutch shifting mechanism, the entire reversing mechanism being housed wholly within the housing 9. The housing 9 is detachably secured to the washer frame by means of suitably attaching bolts 12.

The reversing mechanism within the housing 9 is driven by a suitable vertically disposed shaft 13 which extends through the bottom of the housing 9 and is provided at its lower end with a belt pulley 14 which is aligned with a belt pulley 15 at the upper end of the motor shaft 16 of a vertically disposed electric motor 17 rigidly attached to a portion of the supporting frame, the pulleys 14 and 15 being connected by a suitable driving belt 18. The driving connection between the motor and the drive shaft 13 is preferably controlled by a combined belt tightener and clutch device such as shown and described in my co-pending application Serial No. 633,972 Filed April 23, 1923, in which a driving connection is established by moving a tightening pulley into engagement with the belt and is established by moving the tightening pulley out of engagement by the belt. So far as the present invention is concerned, however, any suitable manually operated device may be employed for establishing and disestablishing the driving connection between the motor and the reversing mechanism.

The vertically disposed driving shaft 13 has a worm 19 fixed thereto adjacent its upper end which meshes with the teeth of a worm wheel 20 which is rotatably mounted upon the cylinder operating shaft 7 adjacent the inner side of the housing 9. The shaft 13 has a spiral gear 21 fixed thereto within the housing and adjacent the bottom thereof which meshes with the spiral gear 22 fixed to a horizontal shaft 23 which extends along the bottom of the housing 9. The horizontal shaft 23 has a worm 24 fixed thereon which meshes with the teeth of a worm wheel 25 which is rotatably mounted upon the cylinder operating shaft outside the gear 20. The worm wheels 20 and 25 are provided with hubs 26 and 27 which bear against the bearings 8 and 10 formed in the sides of the housing and an inner collar 28 fixed to the shaft 7 between the worm gears 20 and 25. The gears 20 and 25 are held against longitudinal movement upon the operating shaft 7 by means of the hubs 26 and 27 thereof which are interposed between the bearings of the shaft 7 and the central collar 28 on the shaft 7.

It will be seen that by means of the driving gears above described the worm wheels 20 and 25 will be continually driven in opposite directions while the drive shaft 13 is being driven from the motor 17.

The central collar 28 has an integral radial arm which is forked to provide parallel branches 29 and 30 which are spaced apart just far enough to receive a flat key bar 31 which is pivoted at its inner end upon a pivot pin 32 carried by the branches 29 and 30 and extending transversely with respect to the shaft 7. The gears 20 and 25 have suitable driving lugs 33 projecting from the inner faces thereof which are adapted to engage the key bar 31 to rotate the cylinder operating shaft 7. Where the gears are provided with more than one driving lug these lugs will be regularly spaced circumferentially of the gears. In advance of each of the driving lugs 33 there is an arcuate inclined raised portion 34 upon the inner faces of the gears with which the key bar 31 is adapted to engage prior to its engagement with the driving lug. The inclined portions 34 preferably extend from adjacent the front face of one lug about half way to the next driving lug. A notch 35 is provided immediately in front of each driving lug 33 into which the key bar 31 is adapted to snap after it has passed over the inclined raised portions 34. The latch bar 31 has spot indentations 36 and 37 upon its opposite side faces adjacent its outer end which are adapted to be engaged by pins 38 slidably mounted in the outer ends of the forks 29 and 30. The outer ends of the pins 38 are engaged by the free ends of flat leaf springs 39 which are attached to the outer faces of the forks 29 and 30. The pins 38 have conical ends adapted to engage in the indentations 36 and 37 and the indentations 36 and 37 are so arranged that when the pins 38 are in full engagement therewith the key bar is releasably locked in driving engagement with one or the other of the worm gears.

The key bar 31 has a pointed outer end 40 which is adapted to engage with a star wheel 42 which is mounted upon a fixed shaft carried by the housing 9 and projects between the worm wheels 20 and 25. The star wheel 42 has regularly spaced teeth 43 which are engaged successively by the pointed end of the key bar 31 at each revolution of the cylinder operating shaft 7. Two adjacent spaces between teeth of the star wheel have filled in portions 44 and 45 which are formed with oppositely inclined surfaces 46 and 47 which are adapted to engage with the pointed end 40 of the key bar 31 to alternately shift the key bar in opposite directions, each shifting movement of the key bar being effected after a predetermined number of revolutions of the cylinder operating shaft 7.

The indentations 36 and 37 in the key bar 31 are arranged so closely together that the spring pressed pins 38 will always operate to yieldingly press the key bar into engagement with one or the other of the worm gears. Furthermore, the gears 20 and 25 are arranged so closely together that the key bar 31 moves into the path of the driving lug of one gear before it is entirely freed from the lug of the other driving gear and it is impossible for the driving lug to occupy the neutral position. In the operation of the reversing gear the key bar 31 at each revolution of the shaft 7 will engage with a tooth of the star wheel 42 and turn the star wheel an amount equal to the angular distance between the teeth thereof. When the point end 40 of the key bar 31 comes into engagement with the inclined surface of one of the filled portions of the star wheel, the key bar will be shifted in a direction away from the gear with which it is in driving engagement. This shifting movement is sufficient to move the indentations with which the pins 38 are out of engagement with the pin and to bring the other pair of indentations in engagement with the pins 38 so that the key bar 31 will be yieldingly pressed against the face of the gear toward which it has been moved. The star wheel 42 is so disposed that the shifting of the key bar 31 occurs at a time when a flat portion of the inner face of the gear toward which the key bar is moved is opposite the key bar so that the key bar is always moved into engagement with the gear immediately in advance of the inclined portion 34 leading to the driving lug. The action of the spring pressed pins 38 upon the depressions 36 and 37 is such that while the key bar is pressed toward the face of the gear there is a frictional resistance in addition to the spring pressure due to the engagement of the points of the pins against the inclined walls of the depressions which resist movement of the key bar away from the face of the gear. As the arcuate inclined surface 34 moves into engagement with the key bar 31 the key bar will be forced outwardly against the frictional resistance offered by the spring pressed plates 38 engaging in the indentations in the bar exerting a strong braking action upon the shaft 7 which will gradually bring the shaft 7 to rest and start the same moving in a reverse direction before the key bar 31 engages with the oppositely driving lug 33 and snaps into the notch 35. The key bar and inclined faces of the worm gears co-act in the reversing operation to frictionally absorb the momentum of the driven part and to gradually reverse the direction of movement thereof without any noticeable shock or jar and regardless of whether the driven part is operating under a load or not. The key shifting portions of the star wheel are preferably so arranged that the reversing operation is performed while the opening of the cylinder is at the top of the tub. By reason of the worm gear drive the gears 20 and 25 are instantly stopped and locked against rotation whenever the driving motor is disconnected. The operator may be shifting the drive controlling lever simultaneously with the click which occurs whenever the key bar 31 is shifted, instantly bringing the cylinder to a stop with the closure member thereof at the top of the cylinder and the cylinder will be locked against rotary movement which is convenient when the clothes are being inserted or removed from the cylinder.

Having described my invention, I claim

1. A drive mechanism comprising a shaft, a pair of shaft driving members rotatably mounted on said shaft, means for continuously driving said members in opposite directions, a clutch member rotatable with the shaft and movable into engagement with either of said members, said clutch member adapted to have a yielding frictional engagement with said members and a positive locking engagement therewith, and automatic means for periodically shifting said clutch member from engagement with one member into engagement with the other, said clutch member upon each actuation thereof moving first into frictional sliding engagement with a driving member and then into positive driving engagement therewith.

2. A drive mechanism comprising a shaft, a pair of gears rotatably mounted on the shaft, means for continuously driving the gears in opposite directions, a clutch member rotatable with the shaft and movable from a position in which it engages one gear to a position in which it engages the other gear, means operable in either position of the clutch member for yieldingly pressing the clutch member toward the gear which it engages, means on the gear adapted to be slidably engaged by the clutch member and acting to brake the shaft upon the initial engagement of the clutch member with the gear, means on the gear adapted to engage the clutch to form a positive driving connection therewith, and means for automatically and periodically shifting the gear from one engaging position to the other and acting to first engage the clutch with the braking means on the gear and subsequently with the positive driving means.

3. A drive mechanism comprising a shaft, a pair of rotatable members loose on said shaft, an outwardly extending arm fixed to the shaft between said rotatable members, a shiftable member carried by said arm and adapted to be moved in opposite directions transversely with respect to the arm and longitudinally of the shaft into driving engagement with either gear, and means operating periodically upon a predetermined number of revolutions of the shaft in either direction to shift said shiftable member.

4. A drive mechanism comprising a shaft, a pair of rotatable members loose on said shaft, said members having lugs projecting inwardly from the inner faces thereof, an outwardly extending arm fixed to the shaft between said rotatable members, said arm having a part movable in a direction transversely thereof and longitudinally of the shaft into the path of a lug of either of the rotatable members and means for shifting the movable part of the arm periodically upon a predetermined number of revolutions of the shaft in either direction.

5. A drive mechanism comprising a shaft, a pair of gears loose on the shaft, said gears having driving lugs on their inner faces, an arm fixed to the shaft between the gears and a key pivoted at its inner end to said arm and movable into engagement with either gear.

6. A drive mechanism comprising a shaft, a pair of gears loose on the shaft, said gears having driving lugs on their inner faces, an arm fixed to the shaft between the gears, a key pivoted at its inner end to said arm movable into engagement with either gear, and means operating automatically to alternately shift the key in opposite directions to alternately connect the gears to the shaft.

7. A drive mechanism comprising a shaft, a pair of rotatable gears loose on said shaft, an arm fixed to the shaft between said rotatable members, a member pivoted to said arm and adapted to be swung in opposite directions longitudinally of the shaft into driving engagement with either gear and means operating periodically upon a predetermined number of revolutions of the shaft in either direction to shift said shiftable member.

8. A drive mechanism comprising a shaft, a pair of gears loose on the shaft, said gears having driving lugs on their inner faces, an outwardly extending arm fixed to the shaft between the gears, a key pivoted at its inner end to said arm and movable about said pivot and transversely of the arm into engagement with either gear, and means mounted on a fixed support and engageable with the outer end of the pivoted key to alternately shift the key in opposite directions to alternately connect the gears to the shaft.

9. A drive mechanism comprising a shaft, a pair of gears loose on the shaft, an arm rotatable with the shaft and having a part shiftable in opposite directions longitudinally of the shaft into driving engagement with either gear, and a member mounted in a position to be periodically engaged by said shiftable part during the rotation thereof and adapted to shift said part alternately into engagement with the gears, each shift occurring after a number of revolutions of the shaft.

10. A drive mechanism comprising a shaft, a pair of gears loose on the shaft, driving lugs on the inner sides of the gears, an arm rotatable with the shaft, a key pivoted at its inner end to the arm on an axis transverse with respect to the shaft and extending past the end of the arm, a star wheel mounted with the teeth thereof in position to be engaged by the outer end of the key in the revolution thereof, said star wheel having portions with opposite lateral inclinations alternately engageable with the key to shift the same alternately in opposite directions.

11. In a drive mechanism, a shaft, a pair of gears loose on the shaft, a shiftable key rotatable with the shaft and mounted between said gears, and a star wheel rotatably mounted in a position in which the teeth thereof are engaged by the key to impart a step by step movement to the wheel during the rotation of the shaft, said star wheel having two of the peripheral spaces between teeth thereof partially filled and providing laterally and oppositely inclined key engaging surfaces adapted to alternately shift the key in opposite directions.

12. A drive mechanism comprising a shaft, a pair of gears loose on the shaft, driving lugs on the inner sides of the gears, a member fixed to the shaft between the gears, a key pivoted at its inner end to the member on an axis transverse to the shaft, the outer end of the key projecting outwardly beyond the member, said key being movable into the path of movement of the driving lug of either gear, and a member mounted on a fixed support in position to be engaged by the key during a rotation of the shaft, said member having oppositely and laterally inclined surfaces adapted to be alternately engaged by the outer end of the key to shift the same alternately in opposite directions.

13. A drive mechanism comprising a shaft, a pair of gears loose upon said shaft, a shiftable key rotatable with the shaft, said key being mounted between the gears and movable into driving engagement with either gear, a member mounted on a fixed support and having oppositely inclined surfaces adapted to be alternately engaged by a part of the key to impart initial movements to the key alternately in opposite directions, and spring means rotatable with the key for imparting the final movements to the key in both directions.

14. A drive mechanism comprising a shaft, a pair of gears loose on the shaft, driving lugs on the inner sides of the gears, an arm fixed to the shaft between the gears, a key pivoted at its inner end to said arm upon an axis transverse with respect to the shaft whereby said key can be swung about its pivot into the path of movement of a driving lug on either gear, said key having oppositely inclined portions on a side face thereof, a spring pressed member carried by the arm and engageable with one or the other of the inclined surfaces to yieldingly press the key into engagement with one or the other of the gears, and means for imparting an initial movement to the key in either direction sufficient to shift one of the inclined surfaces out of engagement with the spring pressed member and the other into engagement with said member whereby the key is shifted out of engagement with one gear and into the path of movement of the lug on the other gear.

15. A drive mechanism, comprising a shaft, a pair of gears loose on the shaft, said gears having driving lugs on the inner sides thereof and portions on their inner sides in advance of each lug inclined inwardly from adjacent the front faces of the lugs toward the central plane of the gear, a key rotatable with the shaft and mounted between the gears, said key being shiftable into the path of movement of a lug on either gear, means for shifting said key from engagement with the lug of one gear into engagement with the side of the other gear in advance of an inclined portion of the inner side thereof and for yieldingly pressing said key into engagement with the side of the gear toward which it is shifted.

16. A drive mechanism comprising a shaft, a pair of gears loose on the shaft, a key between the gears and rotatable with the shaft, said key being shiftable into and out of driving engagement with either of the gears, means for imparting an initial movement to the key in either direction, and means for exerting spring pressure upon the key to yieldingly press the same against the gear toward which it has been initially moved and for exerting frictional resistance to movement of the key in an opposite direction.

17. A drive mechanism comprising a shaft, a pair of gears loose on the shaft, said gears having driving lugs upon the inner sides thereof and arcuate raised portions inclined inwardly from adjacent the front faces of the lugs, a key between the gears rotatable with the shaft and movable alternately into engagement with the inner sides of the gears in the path of movement of the lugs, means for imparting initial movements to the keys to shift the same away from one gear toward the other, said means being operable when the key is opposite a portion of the inner side of the disengaged gear in advance of the inclined arcuate portion, and means for exerting spring pressure upon the key after the initial movement thereof to yieldingly press the same against the gear toward which it has been moved and for imposing a frictional resistance to the reverse movement of the key caused by the movement thereof over the inclined raised portion.

18. A drive mechanism comprising a shaft, a pair of gears loose on the shaft, means for continuously driving said gears in opposite directions, a shiftable key between the gears, said key being rotatable with the shaft and movable into driving engagement with either gear, a movable member mounted on a fixed support and actuated by the driving means, said member having oppositely inclined surfaces adapted to be alternately engaged by a part of the shiftable member in the rotation thereof and to shift said member in opposite directions to cause the shaft to be alternately driven in opposite directions.

19. A drive mechanism comprising a shaft, a pair of gears loose on the shaft, said gears having driving lugs on their inner sides, means for continuously driving the gears in opposite directions, a driving member fixed to the shaft between the gears, a key in the form of a flat bar having a pointed outer end and pivoted to the driving member at its inner end on an axis transverse with respect to the shaft, said bar having laterally spaced depressions on a side face thereof, a spring pressed pin carried by the driving member and engageable with said depressions to yieldingly hold the key in engagement with either gear, and means for shifting the key bar from either engaging positions toward the other comprising a star wheel the teeth of which are engaged by the outer end of the key bar, said star wheel having filled in portions between teeth with oppositely inclined faces engageable with the pointed end of the key bar to shift the same alternately in opposite directions.

20. A drive mechanism comprising a cylinder operating shaft, a pair of closely adjacent worm gears rotatable upon said shaft, means for continuously driving said gears in opposite directions comprising two worm shafts disposed at an angle to each other and having worms engaging the gears at angularly spaced points and meshing spiral gears for driving one shaft from the other and means for driving one of the worm shafts, and means for alternately clutching said worm gears to the cylinder operating shaft.

21. In a drive mechanism, the combination with a washer supporting frame, a gear housing at an end of the frame, a horizontal cylinder operating shaft journaled in the housing and having an end projecting through the inner wall of the housing, a pair of closely adjacent worm gears rotatable on said shaft, a vertical shaft extending into said housing and having a worm thereon engaging one of the worm gears, means for driving said worm shaft, a horizontal shaft journaled in the housing and having a worm thereon engaging the other worm wheel, spiral gears fixed to the two worm shafts and meshing with each other whereby said worm wheels are continuously rotated in opposite directions and means within the housing operating automatically to alternately connect said worm gear to the cylinder operating shaft.

In testimony whereof, I hereunto affix my signature.

ARTHUR R. CURTIS.